United States Patent
Arai et al.

(10) Patent No.: US 8,110,288 B2
(45) Date of Patent: Feb. 7, 2012

(54) CARBON NANOCOMPOSITE MATERIAL COMPRISING A SIC FILM COATING, AND METHOD OF MANUFACTURING THE SAME

(75) Inventors: Keita Arai, Nagano (JP); Tomoyuki Sato, Nagano (JP)

(73) Assignee: Nissei Plastic Industrial Co., Ltd. (JP)

( * ) Notice: Subject to any disclaimer, the term of this patent is extended or adjusted under 35 U.S.C. 154(b) by 602 days.

(21) Appl. No.: 12/217,675

(22) Filed: Jul. 8, 2008

(65) Prior Publication Data

US 2009/0017293 A1     Jan. 15, 2009

(30) Foreign Application Priority Data

Jul. 11, 2007 (JP) ................. P2007-182016
May 26, 2008 (JP) ................. P2008-136500

(51) Int. Cl.
     *B32B 5/16*      (2006.01)
     *B05D 3/10*      (2006.01)

(52) U.S. Cl. .......................... 428/403; 428/404
(58) Field of Classification Search .................. 428/403, 428/404; 427/226, 228
See application file for complete search history.

(56) References Cited

U.S. PATENT DOCUMENTS

| | | | |
|---|---|---|---|
| 3,617,347 A * | 11/1971 | Kuratomi | 427/215 |
| 4,373,006 A * | 2/1983 | Galasso et al. | 428/368 |
| 4,737,382 A * | 4/1988 | Katzman | 427/228 |
| 6,387,531 B1 * | 5/2002 | Bi et al. | 428/570 |
| 6,541,113 B1 * | 4/2003 | Tu et al. | 428/403 |
| 6,821,615 B1 * | 11/2004 | Clough | 428/328 |
| 7,648,765 B2 * | 1/2010 | Takahashi et al. | 428/403 |
| 2005/0208304 A1 * | 9/2005 | Collier et al. | 428/403 |

FOREIGN PATENT DOCUMENTS

JP      044970      2/2006

OTHER PUBLICATIONS

Online machine translation of JP 2006-044,970 (2006).*

* cited by examiner

*Primary Examiner* — Hoa (Holly) Le
(74) *Attorney, Agent, or Firm* — Adams & Wilks (57) ABSTRACT

A carbon nanocomposite material comprises a carbon nanomaterial and Si powder having an average particle diameter of 10 μm or less vacuum-vapor deposited on a surface of the carbon nanomaterial as a film of SiC. The film of SiC has an average thickness in the range of 10 to 50 nm.

7 Claims, 10 Drawing Sheets

FIG.4
(EMBODIMENT 2)

(a)

(b)

FIG.5
(COMP.EX. 2)

CARBON NANOCOMPOSITE MATERIAL COMPRISING A SIC FILM COATING, AND METHOD OF MANUFACTURING THE SAME

FIELD OF THE INVENTION

The present invention relates to a carbon nanocomposite material with improved wettability and a method of manufacturing the same.

BAKGROUND OF THE INVENTION

In recent years, special carbon fibers referred to as carbon nanofibers have received attention as a reinforcing material, and methods of using the material have been proposed.

Figure 10:
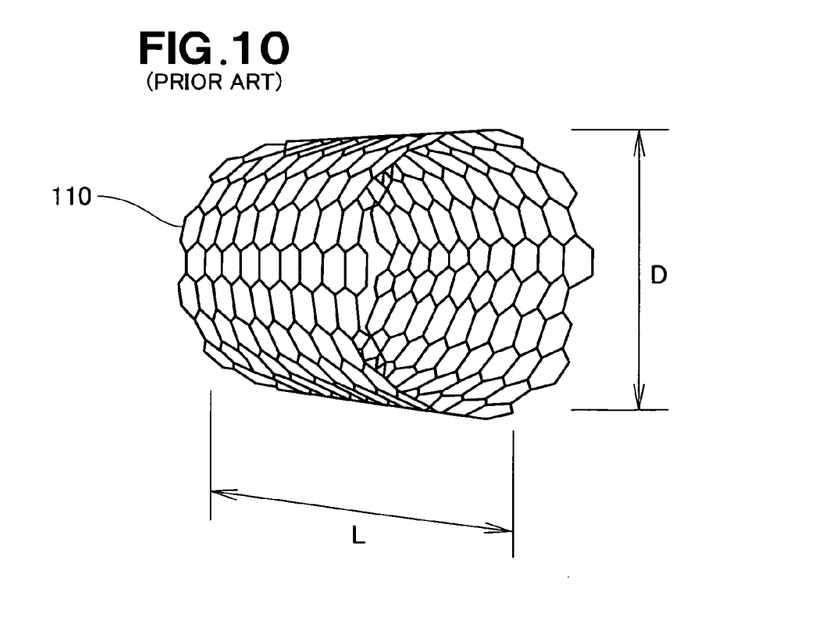
FIG. 10 is a schematic view showing a model of a conventional carbon nanofiber.

FIG. 10 hereof is a schematic view showing a model of a carbon nanofiber. The carbon nanofiber 110 has a configuration in which a sheet composed of carbon atoms arranged in a hexagonal reticulated shape is cylindrically wrapped in a diameter D of 1.0 nm (nanometer) to 150 nm. The fiber is structured on a nanolevel, and is therefore referred to as a carbon nanofiber, a carbon nanomaterial, or a carbon nanotube. A length L ranges from a few micrometers to 100 μm.

A material in which carbon atoms are aligned in a cubic lattice pattern is diamond, and diamond is a very hard material. The carbon nanofiber 110 has considerable mechanical strength because it possesses an ordered crystal structure visibly similar to diamond.

Figure 11:
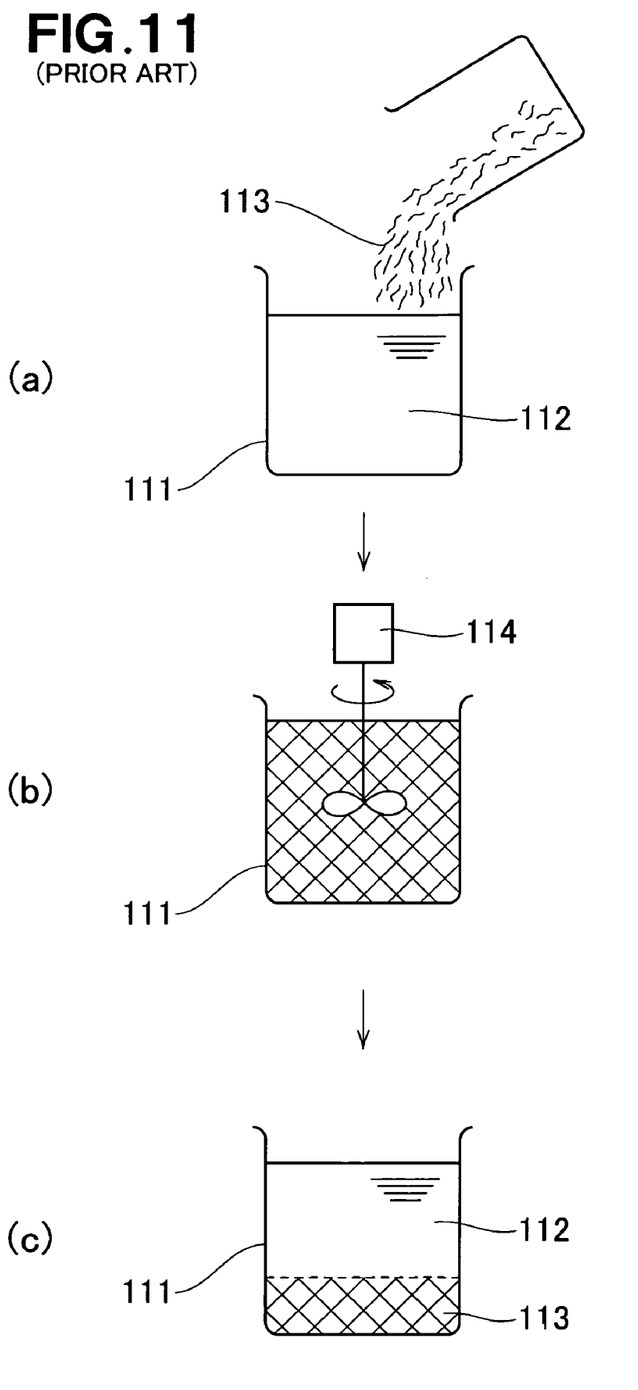
FIGS. 11(a) to (c) are views showing a problem of conventional carbon nanofiber.

FIGS. 11(a) to (c) are views illustrating a problem of a carbon nanofiber.

In FIG. 11(a), a container 111 is filled with a medium 112, and a carbon nanofiber 113 is added to the medium 112 in FIG. 11(a).

In FIG. 11(b), the system is thoroughly agitated using a mixer 114. This agitation can also be performed by an oscillating mixer.

Shown in FIG. 11(c) is the state of the system after being left to stand for a fixed interval of time. It is apparent that the carbon nanofiber 113 has precipitated on the bottom of the container 111.

The carbon nanofiber 113 accumulates on the top if the specific gravity of the media 112 is high.

When the media 112 is a molten metal, the carbon nanofiber 113 cannot be uniformly dispersed in the metal because the carbon nanofiber 113 accumulates on the top of the molten metal. This is the reason that the carbon nanofiber 113 has poor wettability in relation to molten metal.

In view of the above, a surface treatment aimed at improving wettability has been proposed, as disclosed in Japanese Patent Application Laid-Open Publication No. 2006-44970 (JP 2006-44970 A).

Figure 12:
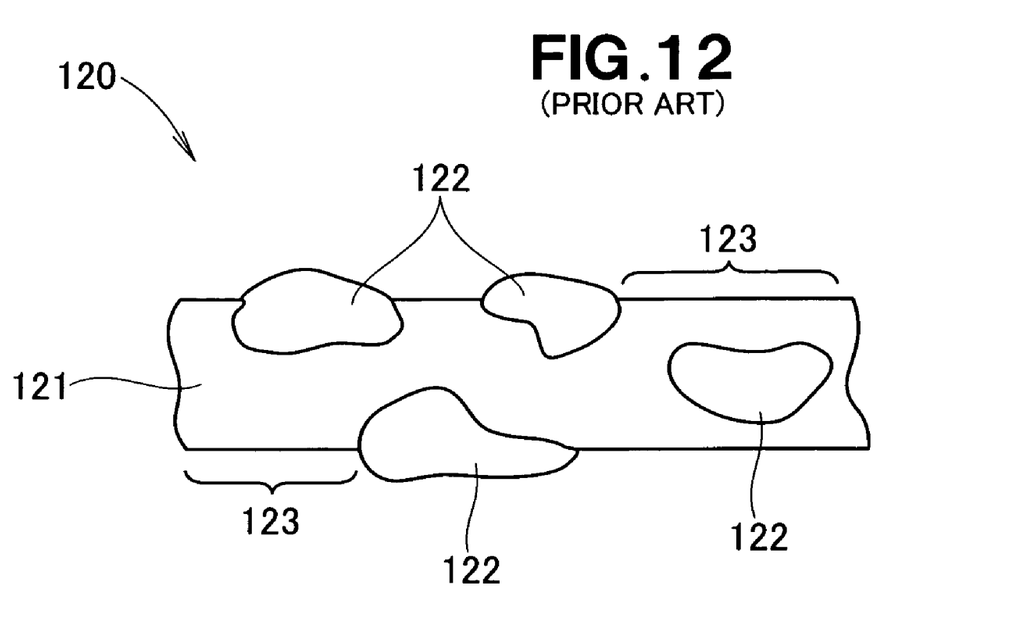
FIG. 12 is an enlarged view of a carbon nanocomposite material manufactured using a conventional method.

Shown in FIG. 12 is a carbon nanocomposite material manufactured using the method disclosed in JP 2006-44970 A.

A carbon nanocomposite material 120 is composed of a disaggregated carbon nanomaterial 121 and a plurality of Si microparticles 122 that are uniformly deposited on the surface of the carbon nanomaterial 121. The Si microparticles 122 are a substance in which Si, which is an element that reacts with carbon and forms a compound, has been crystallized. The Si microparticles 122 are deposited on the surface of the carbon nanomaterial 121, whereby a reaction layer of SiC forms at the interface, and the Si microparticles 122 are securely deposited on the carbon nanomaterial.

Deposition is carried out in conditions in which the temperature of a vacuum furnace is 1400° C. and the furnace pressure is $6 \times 10^{-3}$ to $2.1 \times 10^{-1}$ Pa.

However, there are several portions 123 in which the carbon nanomaterial 121 is exposed. The exposed portions 123 remain in a state of poor wettability.

For this reason, when the carbon nanomaterial 121 has been mixed with molten resin or molten metal, the bonding of the exposed portions 123 to the resin or metal cannot be expected. As a result, it was made apparent that the expected improvement in strength could not be obtained.

SUMMARY OF THE INVENTION

An object of the present invention is to provide a treatment method that can further improve the wettability of a carbon nanomaterial in order to uniformly disperse the carbon nanomaterial in molten metal or the like.

The present inventors investigated the reasons that expected improvement in strength is not obtained in a conventional carbon nanocomposite material. In this investigation, one of the defect factors was found to be that the furnace temperature of a vacuum furnace was set to 1400° C. and the furnace pressure was set to $6 \times 10^{-3}$ to $1 \times 10^{-1}$ Pa. In view of the above, the relationship between the furnace temperature and furnace pressure of the vacuum furnace and the mechanical characteristics of the resulting carbon nanocomposite material were studied in detail. As a result, the appropriate furnace temperature and furnace pressure were identified. A summary of the results is as noted below.

According to an aspect of the present invention, there is provided a carbon nanocomposite material comprising: a carbon nanomaterial, and a film formed on the surface of the carbon nanomaterial, wherein the film contains an element Si, and an average film thickness thereof is 10 to 50 nm.

A composite metal in which a carbon nanocomposite material having an average film thickness of 10 to 50 nm is added to molten metal reduces the depth of abrasion marks. In other words, a dramatic improvement in hardness and other mechanical properties is observed. The film contains Si. Si is a metal having a melting point at which evaporation is possible under a vacuum, and has good wettability with molten metal. Si is inexpensive and simple to procure, and is therefore advantageous in terms of widely disseminating the present invention.

The film is preferably deposited on the entire surface of the carbon nanomaterial. Therefore, the bond between the metal and the carbon nanomaterial is strengthened.

According to another aspect of the present invention, there is provided a method for manufacturing a carbon nanocomposite material comprising: a step for mixing a carbon nanomaterial and microparticles that include an element Si; and an evaporation treatment step for placing the resulting mixed substance in a vacuum furnace, evaporating the microparticles under a high-temperature vacuum, and depositing the vapor on a surface of the carbon nanomaterial, wherein the furnace temperature of the vacuum furnace in the evaporation treatment step is set to from 1100 to 1250° C. and the furnace pressure of the vacuum furnace is set to a higher vacuum than the saturated vapor pressure of the microparticles at the temperature thus set.

A composite metal in which a carbon nanocomposite material manufactured at a furnace temperature setting of 1100 to 1250° C. is added to molten metal reduces the depth of abrasion marks. In other words, a dramatic improvement in hardness and other mechanical properties is observed. The microparticles are Si. Si is a metal having a melting point at which evaporation is possible under a vacuum, and has good wettability with molten metal. Si is inexpensive and simple to procure, and is therefore advantageous in terms of widely disseminating the present invention.

The mixing ratio of the microparticles and the carbon nanomaterial is 1:1. Consequently, a mixing ratio between the microparticles and the carbon nanomaterial of 10:10, that is, 1:1, showed a dramatic improvement in the hardness and other mechanical properties in comparison with a mixing ratio of 5:10 or 1:10.

The average particle diameter of the microparticles is preferably 10 μm or less. Unreacted Si is generated when the average particle diameter of the Si microparticles exceeds 20 μm, and there is no such concern at 10 μm or less. Therefore, the average particle diameter of the microparticles is set to 10 μm or less. The average particle diameter is more preferably 1 μm or less. When the average particle diameter is set to 1 μm or less, the microparticles are more readily vaporized, and a carbon nanocomposite material in which the microparticles are thinly and uniformly deposited can be obtained even if the furnace temperature is reduced.

In the mixing step, an organic solvent is mixed with the carbon nanomaterial and the microparticles, and the resulting mixture is dried. Carbon nanomaterial readily aggregates, but aggregation can be avoided and uniform mixing can be achieved by mixing the microparticles in an organic solvent. As a result, the carbon nanomaterial can be fully coated by the microparticles.

The organic solvent is preferably ethanol. An organic solvent leaves a solvent behind after treatment, and removal of the left solvent therefore becomes a problem. Concerning this point, ethanol is preferred because it can be removed by drying, and post-processing is therefore facilitated.

BRIEF DESCRIPTION OF THE DRAWINGS

Certain preferred embodiments of the present invention will be described in detail below, by way of example only, with reference to the accompanying drawings, in which:

FIGS. 4(a) and (b) are enlarged views of a carbon nanocomposite material in embodiment 2;

FIGS. 5(a) and (b) are enlarged views of a carbon nanocomposite material in comparative example 2;

DETAILED DESCRIPTION OF THE PREFERRED EMBODIMENTS

Reference is now made to FIGS. 1A to 1E showing steps in a method of surface treatment of a carbon nanomaterial according to the present invention.

Figure 1:
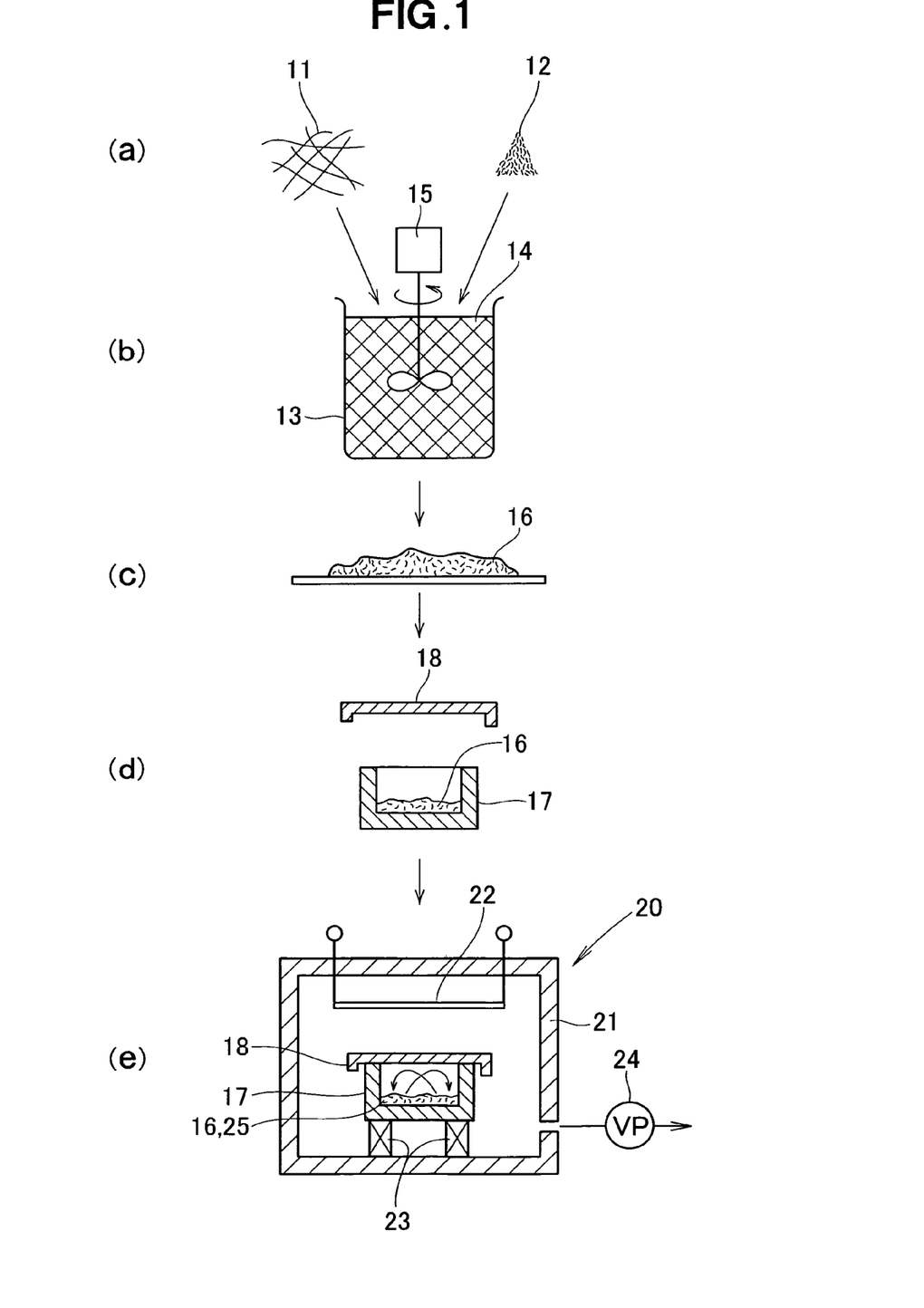
FIG. 1 is a view showing steps in a method of surface treatment of a carbon nanomaterial according to the present invention.

In (a) of FIG. 1, a carbon nanomaterial 11 is prepared in an amount of 10 g, for example. A Si powder 12 composed of microparticles containing an element that reacts with carbon and forms a compound is prepared at the same time in an amount of 10 g, for example.

In (b) of FIG. 1, a container 13 is filled with ethanol 14 as an organic solvent, and the carbon nanomaterial 11 and the Si powder 12 are added. The materials are then agitated and mixed using a mixer 15. The rotational speed of the mixer 15 is 750 rpm. The materials are sufficiently mixed with about 2 hours of agitation.

In (c) of FIG. 1, the resulting mixture 16 is filtered and dried.

In (d) of FIG. 1, the resulting mixture 16 is placed in a zirconium container 17 and covered with a zirconium lid 18. A non-airtight lid is used as the lid 18 to allow for ventilation between the interior and the exterior of the container 17.

In (e) of FIG. 1, a vacuum furnace 20 is provided having an airtight furnace 21, heating means 22 for heating the interior of the furnace 21, a stand 23 on which the container 17 is placed, and a vacuum pump 24 for forming a vacuum inside the interior of furnace 21. The container 17 is placed inside the vacuum furnace 20. The Si powder 12 in the mixture 16 is vaporized by being heated in the vacuum. The vaporized Si makes contact with the surface of the nearby carbon nanomaterial, forms a compound, and is deposited as a film of SiC.

A carbon nanocomposite material 25 in which a film composed of SiC microparticles is deposited on a carbon nanomaterial can be obtained by the method described above.

The method of manufacturing a carbon nanocomposite material according to the present invention comprises: step (a) for preparing a carbon nanomaterial 11 and microparticles 12 containing an element that reacts with carbon to form a compound; a mixing step (b) for mixing the carbon nanomaterial 11, the microparticles 12, and ethanol 14; a drying step (c) for drying the resulting mixture 16; and an evaporation treatment step (e) for placing the dried mixture 16 in a vacuum furnace 20, evaporating the microparticles under a high-temperature vacuum, and depositing the vapor on a surface of the carbon nanomaterial.

Figure 2:
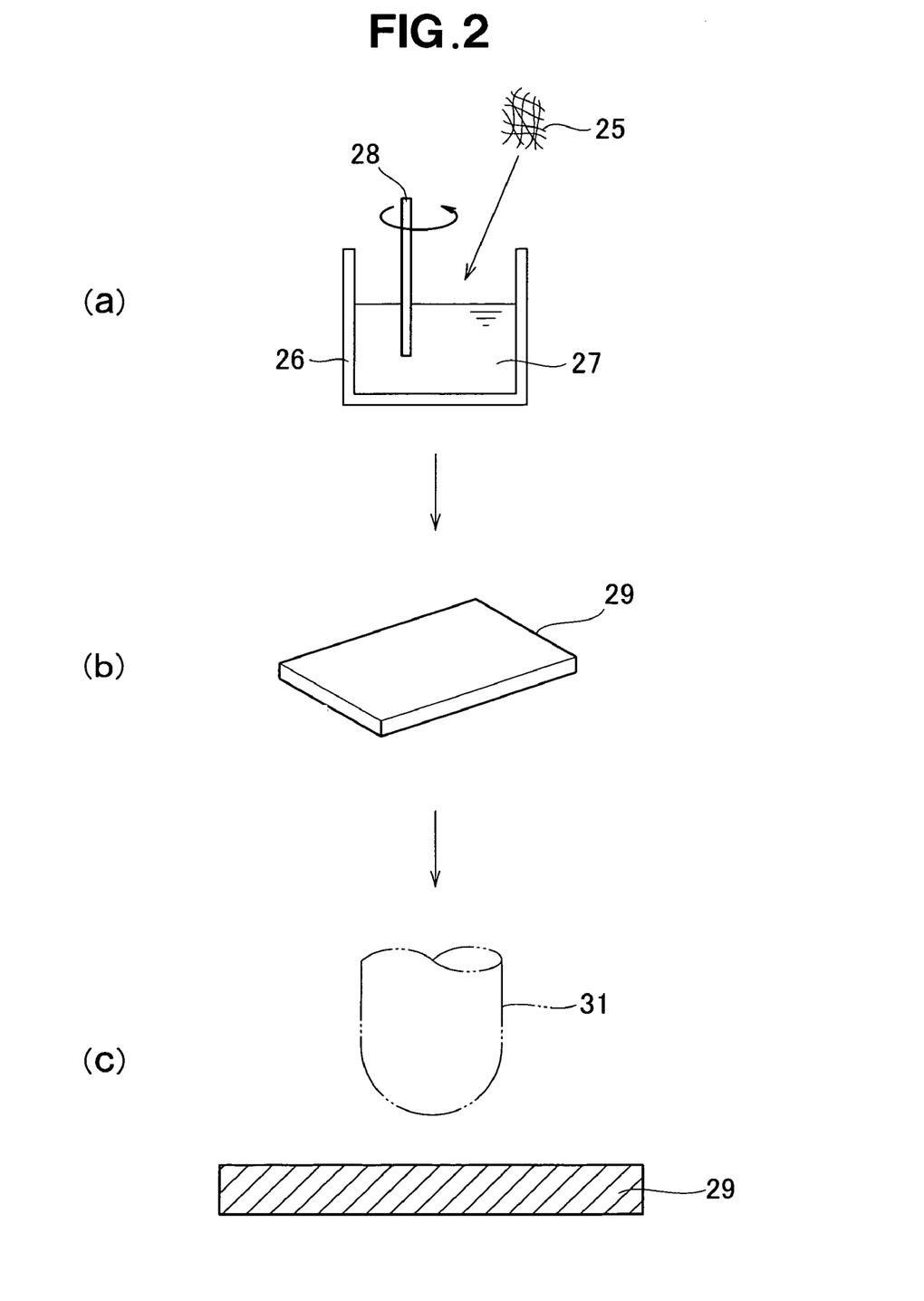
FIGS. 2(a) to (c) are views showing essential points of measuring the depth of abrasion marks.

(a) to (c) of FIG. 2 are views illustrating essential points of measuring the depth of abrasion marks. A test piece is necessary in order to measure the abrasion marks. In view of the above, a high-temperature container 26 is filled with molten Mg (magnesium) 27, a 20 mass % equivalent of the carbon nanocomposite material 25 is introduced into the container, and the materials are thoroughly agitated with a stirring rod 28, as shown in FIG. 2(a). The molten Mg 27 is cooled, and a test piece 29 shown in FIG. 2(b) is produced. The test piece 29 is a flat plate having a thickness of 2 mm, a height of 33 mm, and a width of 30 mm.

A test rod 31 shown in FIG. 2(c) by an imaginary line is rubbed against the test piece 29. The test rod 31 is made of an SUS material and is provided with a spherical surface having a diameter of 10 mm at the distal end (the lower end in the drawing). Contact is made under a pressing force of 200 g (about 3 N), and the test rod is reciprocated 100 times at a distance of 30 mm and a velocity of 600 mm per minute. The depth of the abrasion marks that occur on the surface are measured using a laser microscope. Shallower abrasion marks are preferred.

The quality of the carbon nanocomposite material 25 is affected by the furnace temperature and furnace pressure of the vacuum furnace in the evaporation treatment step conducted in the vacuum furnace 20 shown in FIG. 1(e). The system is also affected by the mixture ratio of the carbon nanomaterial 11 and the Si powder 12, and by the particle diameter (average particle diameter) of the Si powder 12. The experiment discussed in the next section was performed in order to quantitatively confirm these effects.

EXPERIMENTAL EXAMPLES

Experimental examples according to the present invention are described below. The present invention is not limited to the experimental examples below.

Embodiments 1 to 3 and Comparative Examples 1 to 3

A test was carried out in order to establish a suitable value for the furnace temperature in the evaporation treatment step. The experiment conditions and results are summarized in TABLE 1. The asterisks appended to TABLE 1 indicate remarks (the same applies to TABLES 2 to 4).

shown in FIG. 4(a). When a cross-section was then observed, the SiC film 19 having a uniform thickness was deposited on the carbon nanomaterial 11, as shown in FIG. 4(b). The average thickness of the film 19 was about 40 nm.

FIGS. 5(a) and (b) are enlarged views of the carbon nanocomposite material of comparative example (abbreviated to COMP. EX.) 2. The external appearance was observed to have large convexities and concavities in a SiC film 19' formed on the surface of the carbon nanomaterial 11, as shown in FIG. 5(a). When a cross-section was then observed, the SiC film 19' was rough, variability was observed in the thickness, and the average film thickness was about 100 nm, as shown in FIG. 5(b).

Such a carbon nanocomposite material 25 was added to Mg, a test piece was produced, and a test was performed to measure the abrasion marks on the test piece.

Prior to this measurement test, criteria for evaluating the depth of the abrasion marks were established using the following procedure.

The test piece 29 of FIG. 2(c) was replaced by a pure Mg plate. The pure Mg plate was then rubbed by a test rod 31, abrasion marks were produced, and the depth of the abrasion marks was measured and found to be 14.2 µm.

TABLE 1

Figure 4:
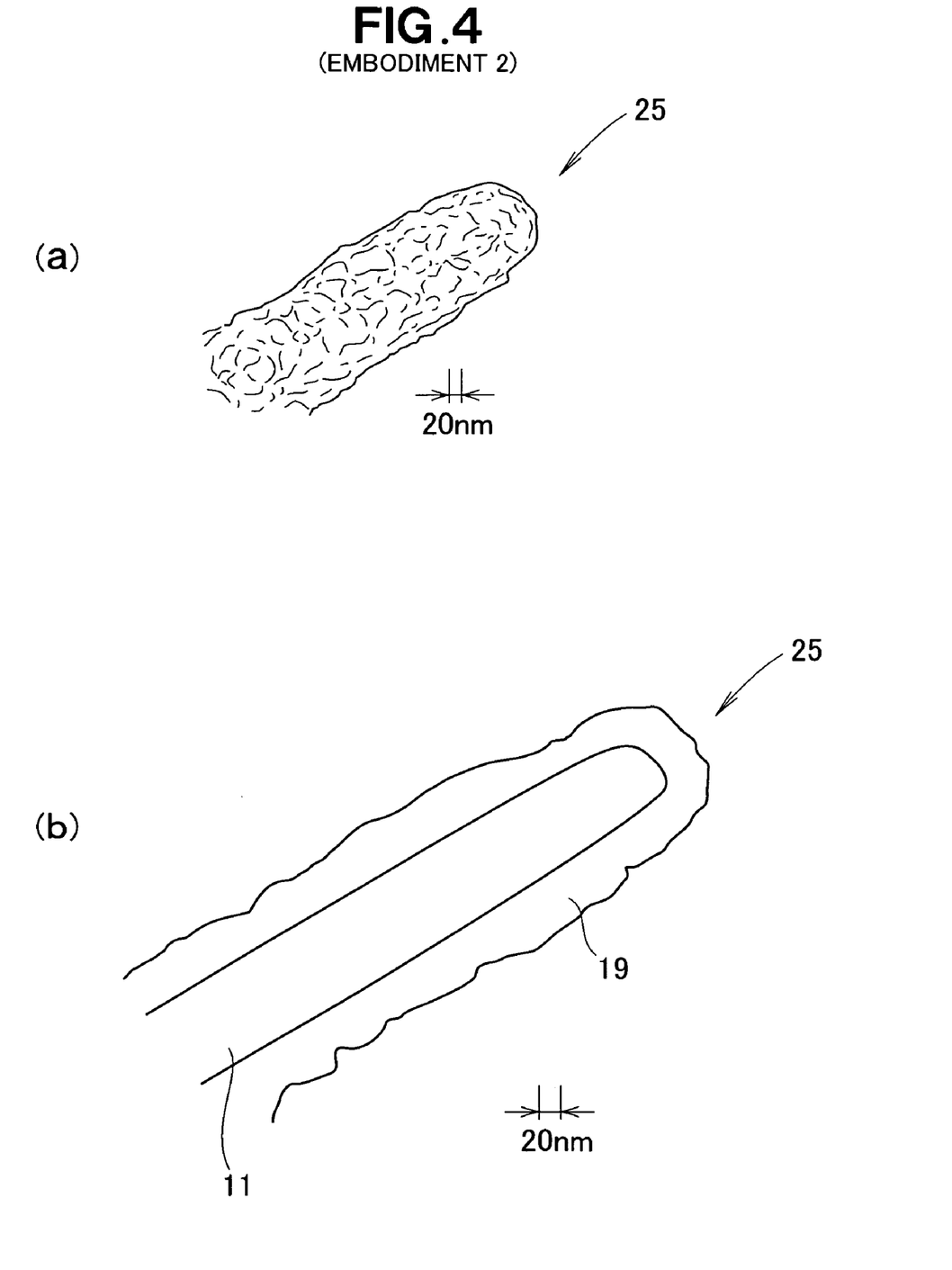
Figure 5:
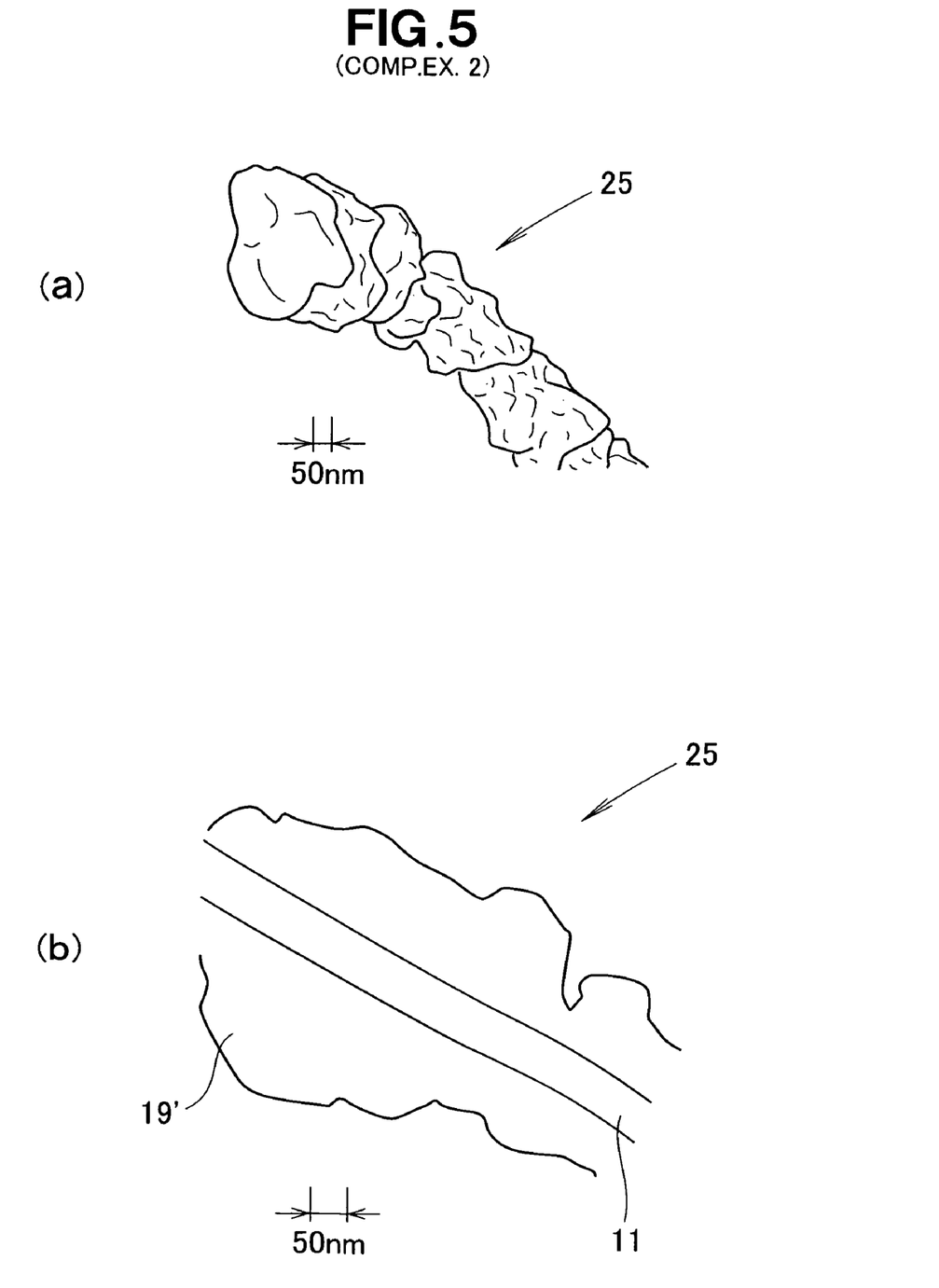

|  |  | Embodiment 1 | Embodiment 2 | Embodiment 3 | Comparative Example 1 | Comparative Example 2 | Comparative Example 3 |
|---|---|---|---|---|---|---|---|
| Carbon nanomaterial |  | \multicolumn{6}{c}{10 g} |  |  |  |  |  |
| Si powder |  | 10 g |  |  |  |  |  |
| Average particle diameter of Si |  | 4 µm |  |  |  |  |  |
| Mixed liquid |  | Ethanol |  |  |  |  |  |
| * Evaporation treatment | Furnace temperature | 1150° C. | 1200° C. | 1250° C. | 1300° C. | 1350° C. | 1450° C. |
|  | Furnace pressure | $1 \times 10^{-5}$ Pa |  |  |  |  |  |
|  | Time | 20 hours |  |  |  |  |  |
| Carbon nanocomposite material | Appearance | — | FIG. 4 | — | — | FIG. 5 | — |
|  | Film thickness | Average 25 nm | Average 40 nm | Average 50 nm | Average 70 nm | Average 100 nm | Average 120 nm |
| Test piece composition |  | 20 mass % carbon nanomaterial + 80 mass % Mg |  |  |  |  |  |
| Depth of the abrasion marks |  | 7 µm | 6.2 µm | 6.5 µm | 7.4 µm | 7.8 µm | 12 µm |
| Determination criterion |  | ½ or less of the depth (14.2 µm) of the abrasion marks in pure Mg |  |  |  |  |  |
| Determination |  | ○ | ○ | ○ | X | X | X |

In other words, the furnace temperature was changed from 1150° C. to 1450° C. in 50° C. (and 100° C.) increments. Additionally, the furnace pressure was set to 1×10⁻⁵ Pa for the following reasons.

Figure 3:
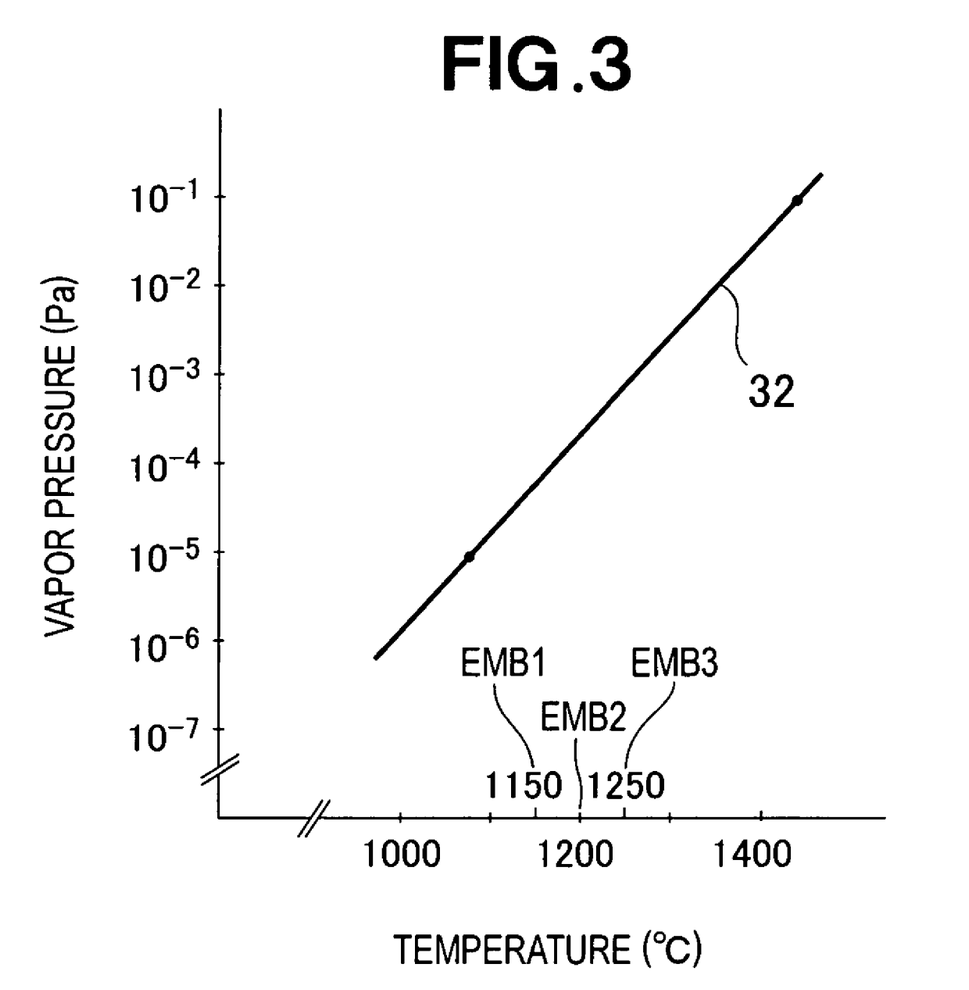
FIG. 3 is a graph showing a vapor of Si.

FIG. 3 shows a vapor diagram of Si. Si evaporates in the area below the Si vapor line 32 (high-vacuum area). In embodiment (abbreviated to EMB.) 1, the furnace temperature was set at 1150° C. The vapor pressure at 1150° C. was about 3×10⁻⁴ Pa. The pressure was set to 1×10⁻⁵ Pa to allow for this vapor pressure. The Si could be adequately vaporized when the furnace pressure was 1×10⁻⁵ Pa. Embodiments 2 and 3 produced similar results.

The evaporation treatment step was completed, and the resulting carbon nanocomposite material 25 was observed under an electron microscope (SEM). Embodiment 2 and comparative example 2 are described with reference to FIGS. 4 and 5 as a typical example.

FIGS. 4(a) and (b) are enlarged views of a carbon nanocomposite material of embodiment 2 (also referred to as EMB. 2). Compactness was observed in the SiC film 19 formed on the surface of the carbon nanomaterial 11, as In the present embodiment, the depth of the abrasion marks can be expected to be less than 14.2 µm because the carbon nanocomposite material was added to Mg to provide reinforcement. In view of the above, the addition of carbon nanomaterial was determined to have an effect at half (½) the value of 14.2 µm or less.

Next, a test was performed to measure the abrasion marks on the test pieces of embodiments 1 to 3 and comparative examples 1 to 3, as shown in TABLE 1.

The depth of the abrasion marks in embodiment 1 having a furnace temperature of 1,150° C. was 7 µm.

The depth of the abrasion marks in embodiment 2 having a furnace temperature of 1,200° C. was 6.2 µm.

The depth of the abrasion marks in embodiment 3 having a furnace temperature of 1,250° C. was 6.5 µm.

The depth of the abrasion marks in comparative example 1 having a furnace temperature of 1300° C. was 7.4 µm.

The depth of the abrasion marks in comparative example 2 having a furnace temperature of 1350° C. was 7.8 µm.

The depth of the abrasion marks in comparative example 3 having a furnace temperature of 1400° C. was 12 µm.

Figure 6:
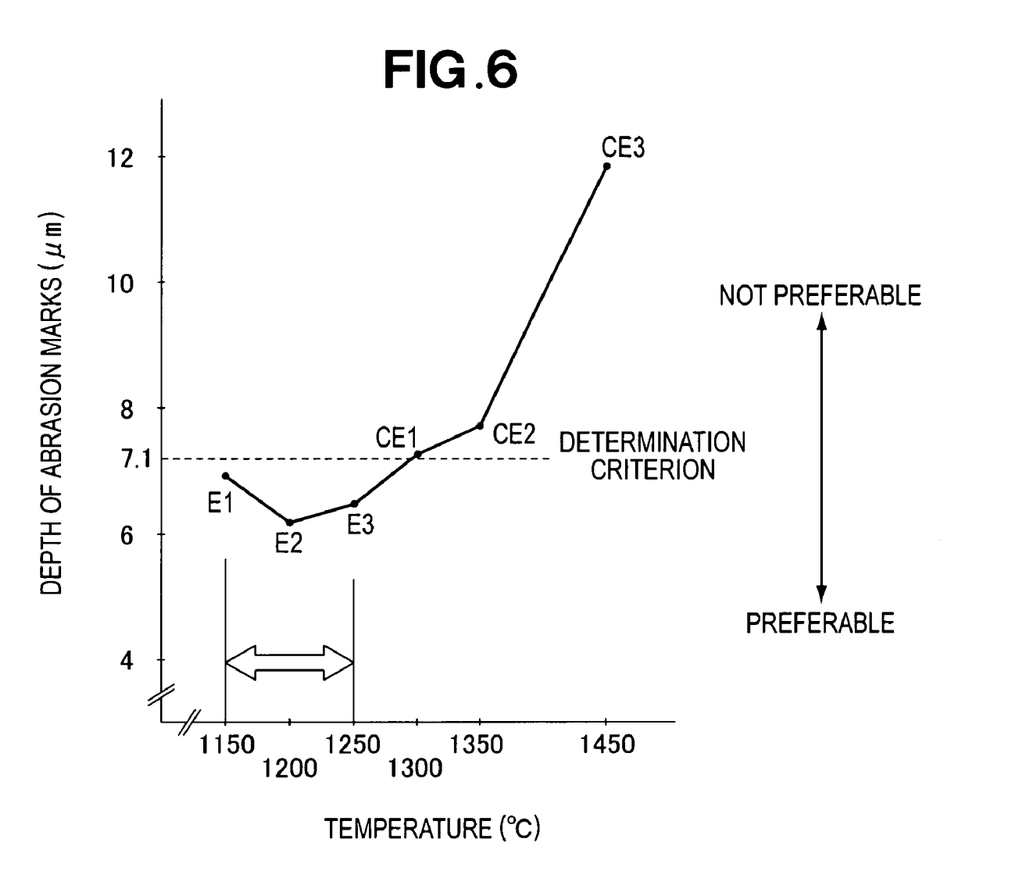
FIG. 6 is a graph showing a relationship between the furnace temperature and the depth of abrasion marks.

FIG. 6 is a graph showing the relationship between the furnace temperature and the depth of the abrasion marks. A dramatic effect of the carbon nanomaterial was observed by setting the furnace temperature to a temperature of 1150° C. to 1250° C. Particularly, embodiment 2 exhibited the best effect. In the graph, E1 to E3 represent embodiments 1 to 3. Represented by CE1 to CE3 are comparative examples 1 to 3.

Figure 7:
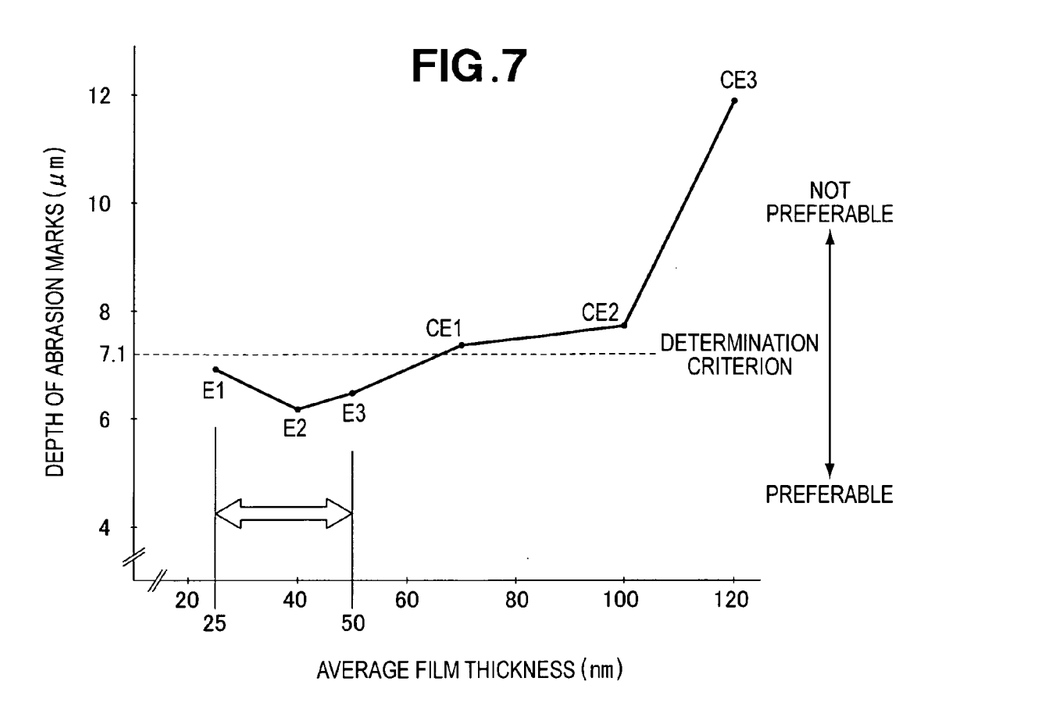
FIG. 7 is a graph showing a relationship between the average film thickness and the depth of abrasion marks.

FIG. 7 is a graph showing the relationship between the average film thickness and the depth of the abrasion marks. A dramatic effect of the carbon nanomaterial was observed in an average film thickness range of 25 to 50 nm.

Comparative Examples (CE) 4 and 5

Since embodiment 2 exhibited the best results, embodiment 2 was used as a reference and only the quantity of Si powder was changed. In other words, the quantity of Si powder was 10 g in embodiment 2, but was changed to 5 g in comparative example 4, and 1 g in comparative example 5. The quantity of carbon nanomaterial was kept at 10 g. The result is shown in TABLE 2 below.

TABLE 2

|  | Embodiment 2 | Comparative Example 4 | Comparative Example 5 |
|---|---|---|---|
| Carbon nanomaterial | | 10 g | |
| * Si powder | 10 g | 5 g | 1 g |
| Average particle diameter of Si | | 4 μm | |
| Mixing liquid | | Ethanol | |
| Evaporation processing Furnace temperature | | 1200° C. | |
| Furnace pressure | | $1 \times 10^{-5}$ Pa | |
| Time | 20 hours | 5 hours | 5 hours |
| Test piece composition | | 20 mass % carbon nanocomposite material + 80 mass % Mg | |
| Depth of the abrasion marks | 6.2 μm | 7.8 μm | 9.1 μm |
| Determination criterion | | ½ or less of the depth (14.2 μm) of the abrasion marks in pure Mg | |
| Determination | ○ | X | X |
| Wettability | 35° | 40° | 42° |

In accordance with TABLE 2, the depth of the abrasion marks was 7.8 μm in comparative example 4 in which the carbon nanomaterial was 10 g and the Si powder was 5 g.

The depth of the abrasion marks was 9.1 μm in comparative example 5 in which the carbon nanomaterial was 10 g and the Si powder was 1 g.

Wettability was also studied. A detailed description will be omitted because the measurement method is the same as the method disclosed in Japanese Laid-open Patent Publication No. 2006-44970.

A lower level of wettability is preferred. The wettability results were 35° in embodiment 2, 40° in comparative example 4, and 42° in comparative example 5. Comparative examples 4 and 5 had poorer wettability than Embodiment 2.

It was confirmed from embodiment 2 and comparative examples 4 and 5 that it is best to mix 10 g of Si powder with 10 g of carbon nanomaterial.

Comparative Examples 6 and 7

Si powder having an average particle diameter of 4 μm was used in TABLES 1 and 2 described above. Time is required when the particle diameter of the Si is increased, and an unfinished reaction is expected in an evaporation treatment time of 20 hours.

In view of the above, an experiment was performed in which the average particle diameter of the Si powder was changed to 10 μm and 20 μm. The results are shown in TABLE 3 below.

TABLE 3

|  | Embodiment 2 | Embodiment 3 | Embodiment 4 | Embodiment 5 | Comparative Example 6 | Comparative Example 7 |
|---|---|---|---|---|---|---|
| Carbon nanomaterial | | | 10 g | | | |
| Si powder | | | 10 g | | | |
| Average particle diameter of Si | 4 μm | 4 μm | 10 μm | 10 μm | 20 μm | 20 μm |
| Mixed liquid | | | Ethanol | | | |
| Evaporation processing Furnace temperature | 1200° C. | 1250° C. | 1200° C. | 1250° C. | 1200° C. | 1250° C. |
| Furnace pressure | | | $1 \times 10^{-5}$ Pa | | | |
| Time | | | 20 hours | | | |
| Unreacted Si | None | None | Trace | None | Large amount | Large amount |
| Determination criterion | | | Trace amounts of or no unreacted Si | | | |
| Determination | ○ | ○ | ○ | ○ | X | X |

When the resulting carbon nanocomposite material was measured using a particle size distribution measuring apparatus (Horiba LA-920 laser diffraction particle size distribution analyzer), unreacted Si powder could not be detected in embodiments 2 and 3 in which the average particle diameter of the Si was 4 μm.

Trace amounts of the unreacted Si powder were detected in embodiment 4 (furnace temperature: 1200° C.) in which the average particle diameter of the Si was 10 μm. However, the amount was within acceptable limits.

Unreacted Si powder could not be detected in embodiment 5 (furnace temperature: 1250° C.) in which the average particle diameter of the Si was 10 μm.

A large amount of the unreacted Si powder was detected in embodiment 6 (furnace temperature: 1200° C.) in which the average particle diameter of the Si was 20 μm.

A large amount of the unreacted Si powder was detected in embodiment 7 (furnace temperature: 1250° C.) in which the average particle diameter of the Si was 20 μm.

Consequently, it is desirable to use Si powder having an average particle diameter of 10 μm or greater.

An additional experiment was subsequently performed in relation to the embodiment shown in TABLE 1 described above. The content and results are described below.

Embodiment 6

The experiment conditions of embodiment 6 are as shown in TABLE 4. Embodiment 1 described in TABLE 1 is included for reference.

TABLE 4

| | | Embodiment 6 | Embodiment 1 |
|---|---|---|---|
| Carbon nanomaterial | | 10 g | |
| Si powder | | 10 g | |
| Average particle diameter of Si | | 1 μm | 4 μm |
| Mixed liquid | | | Ethanol |
| Evaporation treatment | Furnace temperature | 1100° C. | 1150° C. |
| | Furnace pressure | $1 \times 10^{-5}$ Pa | |
| | Time | 20 hours | |
| Carbon nanocomposite material | Appearance | — | — |
| | Film thickness | Average 10 nm | Average 25 nm |
| Test piece composition | | 20 mass % carbon nanocomposite material + 80 mass % Mg | |
| Depth of the abrasion marks | | 7.1 μm | 7 μm |
| Determination criterion | | ½ or less of the depth (14.2 μm) of the abrasion marks in pure Mg | |
| Determination | | ○ | ○ |

In other words, 10 g of the carbon nanomaterial and 10 g of Si powder were mixed in the same manner as embodiment 1 (TABLE 1). The average particle diameter of the Si was 1 μm (4 μm, in embodiment 1). Ethanol was used for the mixed liquid in the same manner as in embodiment 1.

The furnace temperature in the evaporation treatment was 1100° C. (1150° C., in embodiment 1). The furnace pressure was $1 \times 10^{-5}$ Pa in the same manner as in embodiment 1, and the evaporation time was 20 hours in the same manner as in embodiment 1.

In accordance with the vapor diagram of FIG. 3, Si can be evaporated because the intersection point between the horizontal axis at 1100° C. and the vertical axis at $1 \times 10^{-5}$ Pa is in the area below the Si vapor line 32 (high vacuum area). Although evaporation is possible, the rate of evaporation is reduced.

The average particle diameter of the Si, which was 4 μm in embodiment 1, was set to 1 μm in embodiment 6 as a countermeasure. The microparticles could be readily vaporized by setting the average particle diameter to 1 μm, and a carbon nanocomposite material in which the microparticles were thinly and uniformly deposited could be obtained even when the furnace temperature was reduced.

The results shown in TABLE 4 above were obtained after an experiment was performed using the conditions noted above.

In other words, the average thickness of the carbon nanocomposite material was 10 nm, and the depth of the abrasion marks was 7.1 μm.

Figure 8:
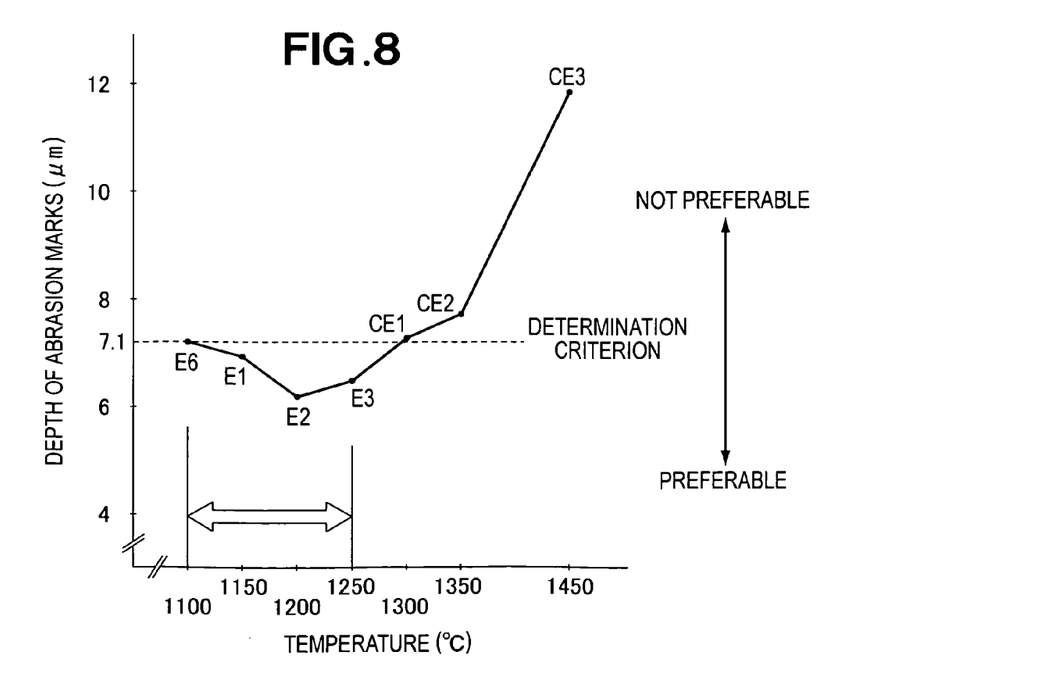
FIG. 8 is a graph in which embodiment 6 is added to the graph shown in FIG. 6 and in which the relationship is shown between the furnace temperature and the depth of abrasion marks.

FIG. 8 is a graph in which the results of embodiment 6 have been added to FIG. 6.

FIG. 8 is a graph to which embodiment 6 is added, and the graph shows the correlation between the furnace temperature and the depth of the abrasion marks. A dramatic effect of the carbon nanomaterial was observed by setting the furnace temperature to from 1100 to 1250° C. In particular, embodiment 2 provided the best results.

Figure 9:
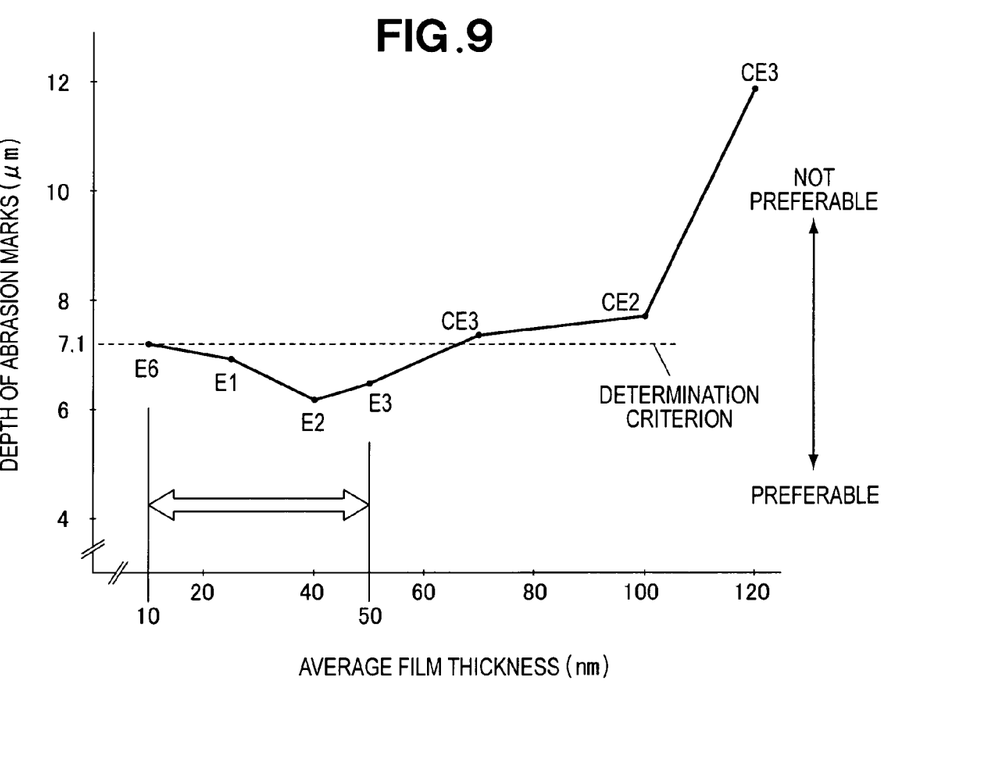
FIG. 9 is a graph in which embodiment 6 is added to the graph of FIG. 7 and in which a relationship is shown between the average film thickness and the depth of abrasion marks.

FIG. 9 shows a graph in which the results of embodiment 6 have been added to FIG. 7.

FIG. 9 is a graph to which embodiment 6 is added, and the graph shows the correlation between the furnace temperature and the depth of the abrasion marks. A dramatic effect of the carbon nanomaterial was observed when the average film thickness was from 10 to 50 nm.

In addition to ethanol, the organic solvent may be methanol or another alcohol; acetone, methyl ethyl ketone, or another ketone; or other ethanols. An aqueous solution that includes these may also be used.

What is claimed is:

1. A carbon nanocomposite material comprising:
   a carbon nanomaterial; and
   Si powder having an average particle diameter of 10 μm or less vacuum-vapor deposited on a surface of the carbon nanomaterial as a film of SiC, the film having an average thickness in the range of 10 to 50 nm.

2. A carbon nanocomposite material according to claim 1; wherein the Si powder having an average particle diameter of 10 μm or less is vacuum-vapor deposited on the entire surface of the carbon nanomaterial.

3. A carbon nanocomposite material according to claim 1; wherein the average thickness of the film is in the range of 25 to 50 nm.

4. A carbon nanocomposite material according to claim 3; wherein the Si powder having an average particle diameter of 10 μm or less is vacuum-vapor deposited on the entire surface of the carbon nanomaterial.

5. A carbon nanocomposite material according to claim 1; wherein the average thickness of the film is 40 nm.

6. A carbon nanocomposite material according to claim 5; wherein the Si powder having an average particle diameter of 10 μm or less is vacuum-vapor deposited on the entire surface of the carbon nanomaterial.

7. A carbon nanocomposite material according to claim 1; wherein the average particle diameter of the Si powder is 1 μm or less.

* * * * *